T. HAYES.
FILTER.
No. 60,512. Patented Dec. 18, 1866.
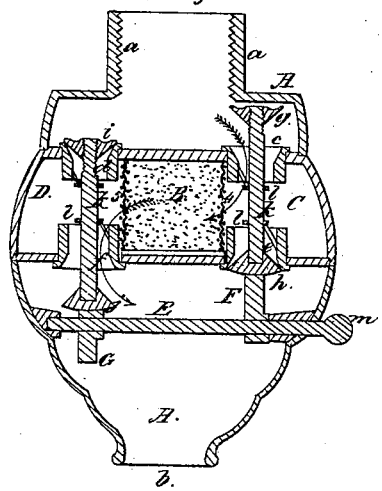
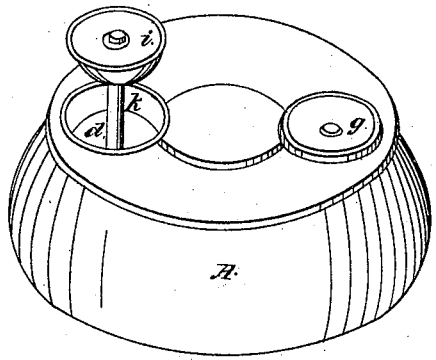
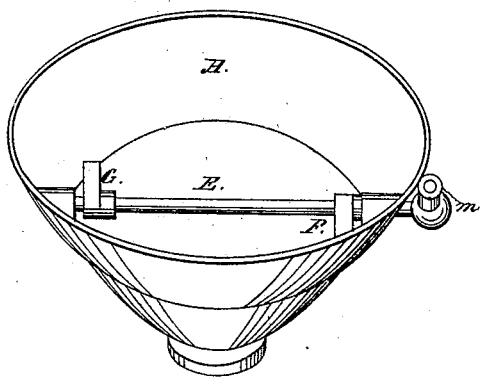
Witnesses: Inventor:
Thomas Hayes

United States Patent Office.

IMPROVEMENT IN FILTERS.

THOMAS HAYES, OF CAMBRIDGE, MASSACHUSETTS.

Letters Patent No. 60,512, dated December 18, 1866.

---

The Schedule referred to in these Letters Patent and making part of the same.

---

TO ALL WHOM IT MAY CONCERN:

Be it known that I, THOMAS HAYES, of Cambridge, in the county of Middlesex, and State of Massachusetts, have invented certain improvements in Reversible Water Filters, of which the following is a full, clear, and exact description, reference being had to the accompanying drawings, making part of this specification, in which—

Figure 1 is a central vertical section through my improved water filter.

Figure 2 is a perspective view of the upper portion of the interior of the same, the top of the casing being removed for this purpose.

Figure 3 represents the interior of the lower portion of the filter.

My invention has for its object to produce a simple and efficient apparatus for filtering water, which may be operated in a convenient and expeditious manner, and my invention consists in a pair of double-acting valves operated from the outside of the filter, the valves, as also a receptacle containing the material through which the water is to be filtered, being enclosed within a casing screwed to the supply-pipe or faucet; the position of the valves being instantly reversed to produce a change in the direction of the current of the water, in order that the impurities which have collected on one side of the strainer of the receptacle containing the filtering medium may be washed away therefrom, when the clear filtered water flows through, and the sediment is collected by the strainer on the opposite side of the receptacle.

To enable others skilled in the art to understand and use my invention, I will proceed to describe the manner in which I have carried it out.

In the said drawings, A is a shell or casing, the upper portion of the inside of which is furnished with a screw-thread, $a$, by which it may be attached to the supply-pipe or faucet, the lower end of the casing forming an orifice, $b$, of delivery. A receptacle, B, containing ground quartz or other suitable filtering medium, and having two of its sides 4, and 5, formed of fine wire gauze or netting, is placed within a closed chamber, dividing it into two compartments, C D, through the top of which are formed the openings, $c\,d$, while the bottom of these compartments is provided with openings, $e\,f$, which incline outwardly, to correspond to the shape of the conical valves, $g\,h\,i\,j$, on the extremities of stems or rods, $k$, the rods being kept in place and allowed to move vertically up and down by the circular guides, $l$. Passing horizontally and diametrically through the casing, A, a short distance above the delivery orifice $b$, is placed a shaft, E, provided with cams, F G, at right angles to each other, one cam being raised while the other is lowered by turning the shaft E by means of a knob or handle, $m$, on one of its ends projecting through the shell or casing. The bottoms of the valves, $h\,j$, rest upon the cams, F G, which open and close as desired by operating the handle $m$. On raising the cam, F, fig. 1, the valves, $g\,h$, are raised, thus opening the passage $c$, and closing the passage $e$. Simultaneously with the raising of the cam, F, the cam, G, is thrown down, thereby lowering the valves, $i\,j$, by which the passage, $f$, is opened and $d$ closed. The filter being attached to the faucet and the water turned on, it passes down through the passage, $c$, in the direction of the arrow into the compartment C, and thence through the side, 4, of the strainer, into the receptacle, B, containing the filtering material, and through the opposite side, 5, of the strainer into the compartment, D, thence down the passage, $f$, and out of the delivery orifice, $b$; the water in its passage depositing the chief portion of its impurities and sediment against the outside, 4, of the strainer of the compartment C, while the remainder of the sediment, if any exists, is arrested by the inside, 5, of the strainer of the compartment D. When the sediment within the filter has accumulated to such an extent as to make it desirable to cleanse the same, the handle $m$ is turned, thus reversing the position of the valves as seen in fig. 2, when the water enters by the opening, $d$, and passing in the opposite direction from that previously described, carries away the sediment collected on the side, 4, of the strainer of the compartment C, and after being thoroughly cleansed, the clean water commences to flow through and the sediment is deposited on the outside, 5, of the strainer of the compartment D. When a quantity of water is to be drawn rapidly, without regard to its being filtered, it is only necessary to turn the knob so that the cams will support the valves in such a position that they will all be open, in which case the water passes directly down the upper passages, $c\,d$, into the compartments C D, and through the lower passages, $e\,f$, out of the orifice $b$. In the foregoing description I have spoken of double-acting valves of the form shown in the drawings, usually denominated "poppet valves," but I do not limit myself to the use of these, as it is evident that I may employ flap or globe valves or slide valves, moving vertically over their passages, or any other description of valves substantially like them; and instead of their being operated by cams, F G, a spring lever, or other device operated from the outside, may be employed for this purpose without departing from the spirit of my invention.

What I claim as my invention, and desire to secure by Letters Patent, is—

The passages $c\ d\ e\ f$, and valves $g\ h\ i\ j$, operated by cams F G, all arranged for the purpose of reversing the current of water through the filterer, substantially as set forth.

THOMAS HAYES.

Witnesses:
P. E. TESCHEMACHER,
N. W. STEARNS.